US010509728B2

(12) United States Patent
Guim Bernat et al.

(10) Patent No.: US 10,509,728 B2
(45) Date of Patent: Dec. 17, 2019

(54) TECHNIQUES TO PERFORM MEMORY INDIRECTION FOR MEMORY ARCHITECTURES

(71) Applicant: INTEL CORPORATION, Santa Clara, CA (US)

(72) Inventors: Francesc Guim Bernat, Barcelona (ES); Karthik Kumar, Chandler, AZ (US); Mark Schmisseur, Phoenix, AZ (US); Thomas Willhalm, Sandhausen (DE)

(73) Assignee: INTEL CORPORATION, Santa Clara, CA (US)

( * ) Notice: Subject to any disclaimer, the term of this patent is extended or adjusted under 35 U.S.C. 154(b) by 118 days.

(21) Appl. No.: 15/719,618

(22) Filed: Sep. 29, 2017

(65) Prior Publication Data
US 2019/0102315 A1    Apr. 4, 2019

(51) Int. Cl.
*G06F 9/46* (2006.01)
*G06F 12/10* (2016.01)
*G06F 12/02* (2006.01)
*G06F 9/30* (2018.01)

(52) U.S. Cl.
CPC ............ *G06F 12/10* (2013.01); *G06F 9/3004* (2013.01); *G06F 12/02* (2013.01); *G06F 12/0207* (2013.01); *G06F 12/0223* (2013.01); *G06F 2212/1016* (2013.01); *G06F 2212/657* (2013.01)

(58) Field of Classification Search
None
See application file for complete search history.

(56) References Cited

U.S. PATENT DOCUMENTS

| 7,296,136 | B1 * | 11/2007 | Collard | G06F 9/30043 |
| | | | | 711/203 |
| 2008/0109624 | A1 * | 5/2008 | Gilbert | G06F 12/0284 |
| | | | | 711/163 |
| 2009/0198904 | A1 | 8/2009 | Arimilli et al. | |
| 2009/0198948 | A1 * | 8/2009 | Arimilli | G06F 12/0862 |
| | | | | 711/203 |
| 2010/0268788 | A1 * | 10/2010 | Arimilli | G06F 9/54 |
| | | | | 709/213 |

(Continued)

FOREIGN PATENT DOCUMENTS

WO    2013142327 A1    9/2013

OTHER PUBLICATIONS

European Search Report and Written Opinion for the European Patent Application No. EP18191340, dated Mar. 6, 2019, 6 pages.

*Primary Examiner* — Ryan Bertram
*Assistant Examiner* — Trang K Ta

(57) ABSTRACT

Various embodiments are generally directed to an apparatus, method and other techniques to receive a request from a core, the request associated with a memory operation to read or write data, and the request comprising a first address and an offset, the first address to identify a memory location of a memory. Embodiments include performing a first iteration of a memory indirection operation comprising reading the memory at the memory location to determine a second address based on the first address, and determining a memory resource based on the second address and the offset, the memory resource to perform the memory operation for the computing resource or perform a second iteration of the memory indirection operation.

24 Claims, 9 Drawing Sheets

(56) References Cited

U.S. PATENT DOCUMENTS

2012/0198156 A1* 8/2012 Moyer .................. G06F 12/06
                                                                  711/118
2013/0219131 A1   8/2013 Alexandron et al.

* cited by examiner

500

RECEIVE A REQUEST FROM A CORE, THE REQUEST ASSOCIATED WITH A MEMORY OPERATION TO READ OR WRITE DATA, AND THE REQUEST COMPRISING A FIRST ADDRESS AND AN OFFSET, THE FIRST ADDRESS TO IDENTIFY A MEMORY LOCATION OF A MEMORY
505

PERFORM A FIRST ITERATION OF A MEMORY INDIRECTION OPERATION COMPRISING READING THE MEMORY AT THE MEMORY LOCATION TO DETERMINE A SECOND ADDRESS BASED ON THE FIRST ADDRESS, AND DETERMINING A MEMORY RESOURCE BASED ON THE SECOND ADDRESS AND THE OFFSET, THE MEMORY RESOURCE TO PERFORM THE MEMORY OPERATION FOR THE CORE OR PERFORM A SECOND ITERATION OF THE MEMORY INDIRECTION OPERATION
510

*FIG. 5*

TECHNIQUES TO PERFORM MEMORY INDIRECTION FOR MEMORY ARCHITECTURES

TECHNICAL FIELD

Embodiments described herein generally include techniques to perform memory indirection operations in memory systems.

BACKGROUND

A computing data center typical includes a number of resources, such as computing resources, memory resources, accelerator resources, and so forth. These resource may be stored in various compute structures (e.g., servers or sleds) and may be physically located on multiple racks. The sleds may include a number of the resources interconnected via one or more compute structures, buses, and interconnects. Computing resources, such as processing cores, may issue memory operation requests and prefetch instructions associated with memory resources coupled via the interconnects. However, in some instances, these requests and instructions over the interconnects may become latency bound because one or more subsequent processing steps cannot proceed unless the contents of a proceeding step are known at the requesting core. As a result, performing memory operations is slow, latency bound and creates heavy serialization in the request flow over the interconnects.

BRIEF DESCRIPTION OF THE DRAWINGS

FIG. 5 illustrates an example of a third logic flow.

DETAILED DESCRIPTION

Figure 1A:
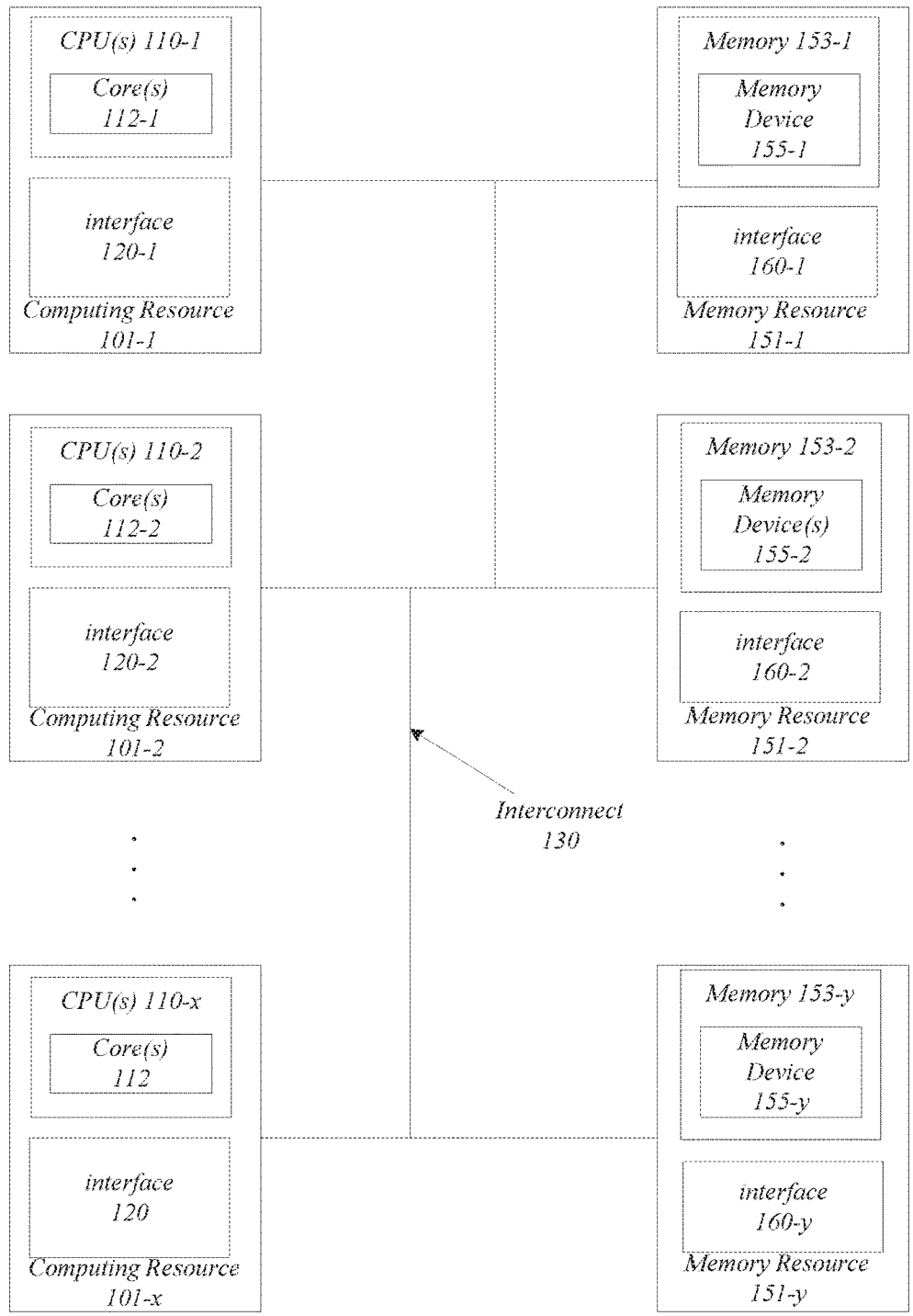
FIG. 1A illustrates a first example of a system.

Embodiments discussed herein may be related to performing memory indirection operations to enable memory operations, e.g., reading from memory and writing data to memory, that are latency bound due to heavy serialization in the memory request flow. As software trends to using more scaled out architectures, providing memory semantics over interconnects becomes important. A common software operation involves memory operations that need to be resolved at the core or processor. For example, databases often use list traversals or tree traversals that involve "pointer resolutions." However, in some instances, prefetch over the interconnects cannot work because one or more subsequent processing steps cannot proceed unless the contents of a proceeding step are known, e.g., there is a hard dependency on a proceeding step to be completed in the core. As a result, performing the above memory operations is slow, and latency bound and creates heavy serialization in the request flow over the interconnects.

In embodiments, one or more iterations of memory indirection operations may be performed to solve these dependency and serialization issues. For example, an iteration of a memory indirection may include a processing core may issue a request to perform a memory operation, and a memory resource having an interface may receive the request from the core. The request may include an address pointing to a memory location of memory resource and an offset. The address and the offset may be used to determine another address of a memory location and to perform another iteration of a memory indirection operation or the memory location may include data to return to the core. In some instances, the request may include an indication of a number of iterations that memory indirection operations are to be performed such that the memory operation to read or write data is processed. These and other details will become more apparent in the following description.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an example embodiment of a system 100 in which aspects of the present disclosure may be employed to perform memory indirection techniques. The system 100 may include a number of resources, such as computing resources 101-1 through 101-x, where x may be any positive integer, and memory resources 152-1 through 152-y, where y may be any positive integer. In embodiments, the computing resources 101 and the memory resources 152 may be part of a data center in a rack configuration. Each of the computing resources 101 and memory resources 152 may be in one of a plurality of sleds. The rack configuration may include other resources, such as accelerator resources and storage resources. Further, the resources may be implemented virtually, physically, or a mixture of virtually and physical. The embodiments are not limited to this example.

In embodiments, the resources, including the computing resources 101 and the memory resources 152 are coupled via one or more interconnect(s) 130, such as a fabric network (Omnipath® or InfiniBand®) or Ethernet network. Other examples of the one or more interconnect(s) 130 includes a QuickPath® interconnect (QPI), a Peripheral Component Interconnect Express (PCIe), a UltraPath interconnect (UPI), and so forth. The interconnect 130 may include one or more switches, bridge interconnects, routers, and network equipment to support fabric or Ethernet communications. The interconnect 130 communicates information and data between the computing resources 101 and the memory resources 152 electrically and/or optically, for example.

The computing resource 101 includes circuitry to process information and data. For example, each of the computing resources 101 include one or more central processing units (CPU) 110 having one or more cores 112. A CPU 110 may be one or more of any type of computational element, such as but not limited to, a microprocessor, a processor, computing processing unit, digital signal processing unit, dual-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit.

Moreover, each of the CPUs 110 includes one or more cores 112 each of which are units that read and execute program instructions. The instructions are CPU instructions, such as add, move, load, and branch. A single CPU 110 having multiple cores 112 can run multiple instructions on separate cores at the same time, increasing overall speed. In embodiments, the cores 112 include elements to read and write data in memory, such as memory 153 of a memory resource 151, via interface 120. In one example, a core 112 may issue a load instruction via interface 120 to read data from memory at a location to put into one or more registers of the core 112. The load instruction may be included in a request communicated to a memory resource 151 via the interconnect 130. In some instances, remote direct memory access (RDMA) is utilized to perform read and writes with the memory 153 of the memory resources 151.

In embodiments, the interface 120 may be any type of interface, such as a host fabric interface (HFI) to communicate via a network fabric, a network interconnect card (NIC) interface to communicate via an Ethernet network, a PCIe interface, a memory fabric interface, a QPI interface, a UPI interface, and so forth. The interface 120 may receive a request from a core 112 to perform a transaction with a memory resource 151. Moreover, an interface 120 may receive responses from the memory resources 151. For example, an interface 120 may receive a response to a request for data from a memory resource 151, the response including the requested data.

The interface 120 enables indirect memory operations by exposing a instruction capability to perform the indirect memory operations with the memory resources 151. An indirect memory operation may include processing a request, such as a read or write request issued to memory resources 151 coupled via an interconnect 130. A request may include an address and an offset, and the address points to a location of memory having another address. The other address is used with the offset to determine a third address, which may be the actual location where the request (read/write) is to be processed. However, in some embodiments, the location identified by third address includes even another address, which may be used with an additional offset to determine a fourth address and another location, which may be used to process the request. Multiple layers of addresses may exist, and the processing of an address pointing to a location having another address may repeat any number of times until the actual location where the request is to be processed is determined and data can be returned to the requesting core.

In embodiments, the instruction capability may include utilizing a fabric load instruction, e.g., "FABRIC-LOAD-I <addr>, <offset>," which may be used by a receiving interface to determine the request is an indirect instruction based on the instruction itself. In some instances, memory indirection operations can be performed locally, within the same computing resource 101 that issues the load instruction for a request. In this example, the instruction capability may include utilizing a load instruction for a local memory indirection with parameters, e.g., "LOAD <addr>, <offset>," is used to perform memory indirection operations for memory requests in memory not disaggregated. The local load instruction may be processed locally by an interface and/or memory controller circuitry, e.g., interface 120 or memory controller circuitry of a computing resource 101 issuing the request. Note that embodiments are not limited to particular instruction nomenclature, e.g., "FABRIC-LOAD-I," and "LOAD <addr>, <offset>," and different nomenclatures may be contemplated such that an interface and memory controller circuitry can identify the instruction as an indirect instruction and include an address and an offset.

In some embodiments, the fabric load and/or the load instruction may include an indication of a number of indirections. In some instances, more than a single indirection is utilized, and a number of nested indirections occur while processing the request. Moreover, the indirections may be local, e.g., within the same resource, or remote, e.g., coupled via an interconnect. In one example, the fabric instruction may be FABRIC-LOAD-I, <number of indirections>, <addr>, <offset>" and the load instruction may be "LOAD <number of indirections>, <addr>, <offset>". Embodiments are not limited to these examples.

The interface 120 may enable existing write semantics having payloads targeted for a disaggregated memory, e.g., memory resources 151, coupled via an interconnect 130, to indicate the request is an indirect instruction. One or more bits in the payload of the request may be used to indicate the request is an indirect instruction. For example, a core 112 may issue a request with a bit in the payload indicating that the request is an indirect instruction. The receiving interface may process the request accordingly, e.g., as an indirect instruction, as will be discussed in more detail below.

Embodiments include memory resources 151 having memory 153, an interface 160, and other components not illustrated to enable embodiments discussed herein. The memory 153 may include a plurality of memory devices 155 to write and read data from. The memory 153 may be one or more of volatile memory including random access memory (RAM) dynamic RAM (DRAM), static RAM (SRAM), double data rate synchronous dynamic RAM (DDR SDRAM), SDRAM, DDR1 SDRAM, DDR2 SDRAM, SSD3 SDRAM, single data rate SDRAM (SDR SDRAM), and so forth. Embodiments are not limited in this manner, and other memory types may be contemplated and be consistent with embodiments discussed herein. For example, the memory 153 may be a three-dimensional crosspoint memory device, or other byte addressable write-in-place nonvolatile memory devices. In embodiments, the memory devices may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory based device, a magnetic tunneling junction (MTJ) based device, a DW (Domain Wall) and SOT (Spin-Orbit Transfer) based device, a thyristor-based memory device, or a combination of any of the above, or other memory.

In embodiments, the memory resource 151 includes the interface 160, such as a HFI to communicate via a network fabric, a NIC interface to communicate via an Ethernet network, a PCIe interface, a memory fabric interface, a QPI interface, a UPI interface, and so forth. The interface 160 processes read and write requests issued by resources, such as the computing resources 101. The interface 160 may receive the request and determine the request is an indirect instruction based on the instruction itself, e.g., the indirect instruction may be a fabric load instruction, e.g., "FABRIC-LOAD-I <addr>, <offset>." In some instances, memory indirection operations can be performed locally, within the same computing resource 101 or memory resource 151 which issues the load instruction for a request. The load instruction for a local memory indirection with parameters, e.g., "LOAD <addr>, <offset>," is used to perform memory indirection operations for memory requests in memory not disaggregated.

The interface 160 may also determine the request is an indirect instruction based on a bit within the request indicating the request is an indirect instruction. As mentioned, a reserved bit of existing read requests or write requests may be used to identify the instruction as an indirect instruction. Embodiments are not limited to these examples.

In embodiments, the interface 160 can process the indirect instruction, and use the address in the request to determine a location in memory having another address. The interface 160 reads the memory at the location to determine the address stored within, for example. The address in the location may be combined with the offset to determine another address of another location, which may be the actual location for the retrieve data for the request or may include another address if there are multiple layers of indirection.

In embodiments, the interface 160 is to send the request to another memory resource that may be coupled via an interconnect. The interface 160 can determine a memory resource 151 associated with the address from the location of memory combined with the offset. For example, a system address decoder is used to determine the memory resource 151 associated with the address combined with the offset. In some instances, the interface 160 may determine the memory associated with the memory resource is local or part of a remote memory resource, e.g., a memory resource coupled via an interconnect.

For example, memory resource 151-1 including interface 160-1 may receive a request and determine an address with the request. The interface 160-1 may use the address to locate another address in memory 153-1. The interface 160-1 may use the address from the memory 153-1 in combination with an offset from the request to determine another address, e.g., a third address in this case. The interface 160-1 may use a system address decoder to determine a memory of a memory resource 151, the memory may be local, within the current memory resource 151-1, or remote, within another memory resource 151-$y$. If the memory associated with the determined address is local, the interface 160-1 may cause the memory resource 151-1 to process the request, or perform another indirection iteration. The interface 160-1 may send data to processing circuitry, processing component, controller, and so forth to cause processing the request or perform another indirection iteration, for example. If the memory is remote in a remote memory resource 151-$y$, the interface 160-1 may send the request to the remote memory resource 151-$y$, which may either process the request and return data to the requesting processing resource or perform another indirection iteration.

In some instances, an interface 160 determines and report when a failure occurs. For example, a failure may occur when performing the lookup to determine the address at the location of memory based on the address received in the request. There may not be an address, the address may be corrupted, the memory read may fail, and so forth. In another example, a failure may occur when the system address decoder is trying to decode the address in the location plus the offset. The interface 160 returns a response indicating that a failure has occurred. More specifically, the interface 160 may return a response including a failure indication which may include a failed address and a failed iteration of memory indirection operation.

Figure 1B:
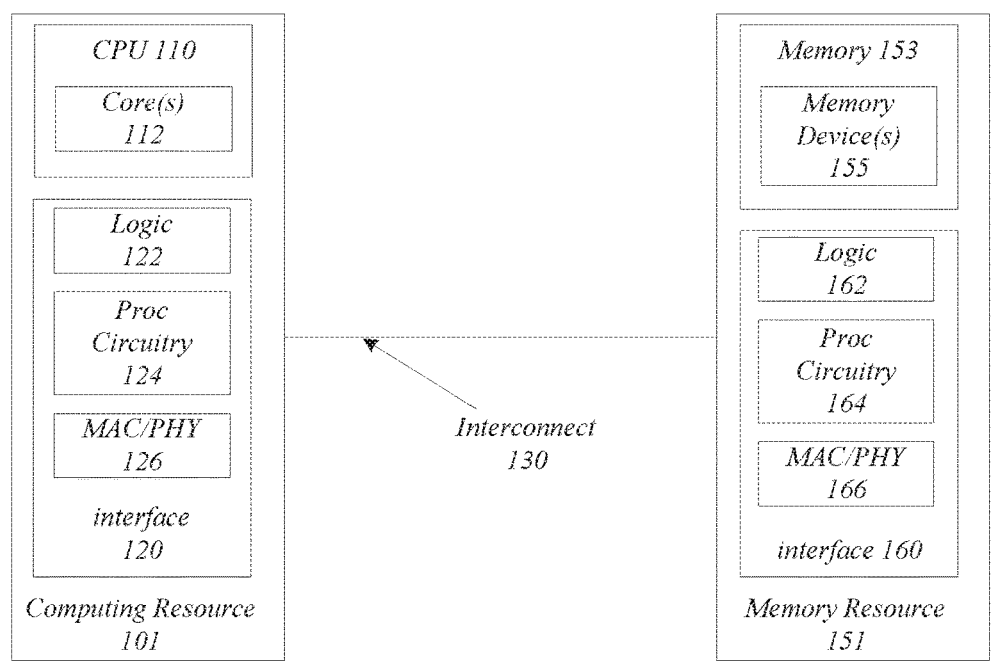
FIG. 1B illustrates a second example of a system.

FIG. 1B illustrates system 150 including a computing resource 101 coupled with a memory resource 151 via interconnect 130. The illustrated example includes further details of interface 120 of a computing resource 101 and interface 160 of a memory resource 151. However, embodiments are not limited in this manner, and the resources may include additional circuitry, memory, logic, and so forth to perform other one or more operations and processing.

The computing resource 101 includes interface 120 further including logic 122, processing circuitry 124, and medium access control (MAC) and physical (PHY) layer circuitry/logic 126. The logic 122 includes one or more instructions stored in memory that is operable on the processing circuitry 124 to perform one or more operations for interface 120. The operations include operations discussed concerning FIG. 3, for example. The logic 122 can be stored in non-volatile memory, for example. The MAC/PHY layer circuitry 126 processes data to enable communication via interconnect 130, e.g., one or more fabric and Ethernet communications.

The memory resource 151 includes interface 160 further including logic 162, processing circuitry 164, and MAC/PHY layer circuitry/logic 166. The logic 162 includes one or more instructions stored in memory that is operable on the processing circuitry 164 to perform one or more operations for interface 160, such as those discussed concerning FIG. 2. The logic 162 can be stored in non-volatile memory, for example. The MAC/PHY layer circuitry 166 processes data to enable communication via interconnect 130, e.g., fabric or Ethernet communications.

Figure 2:
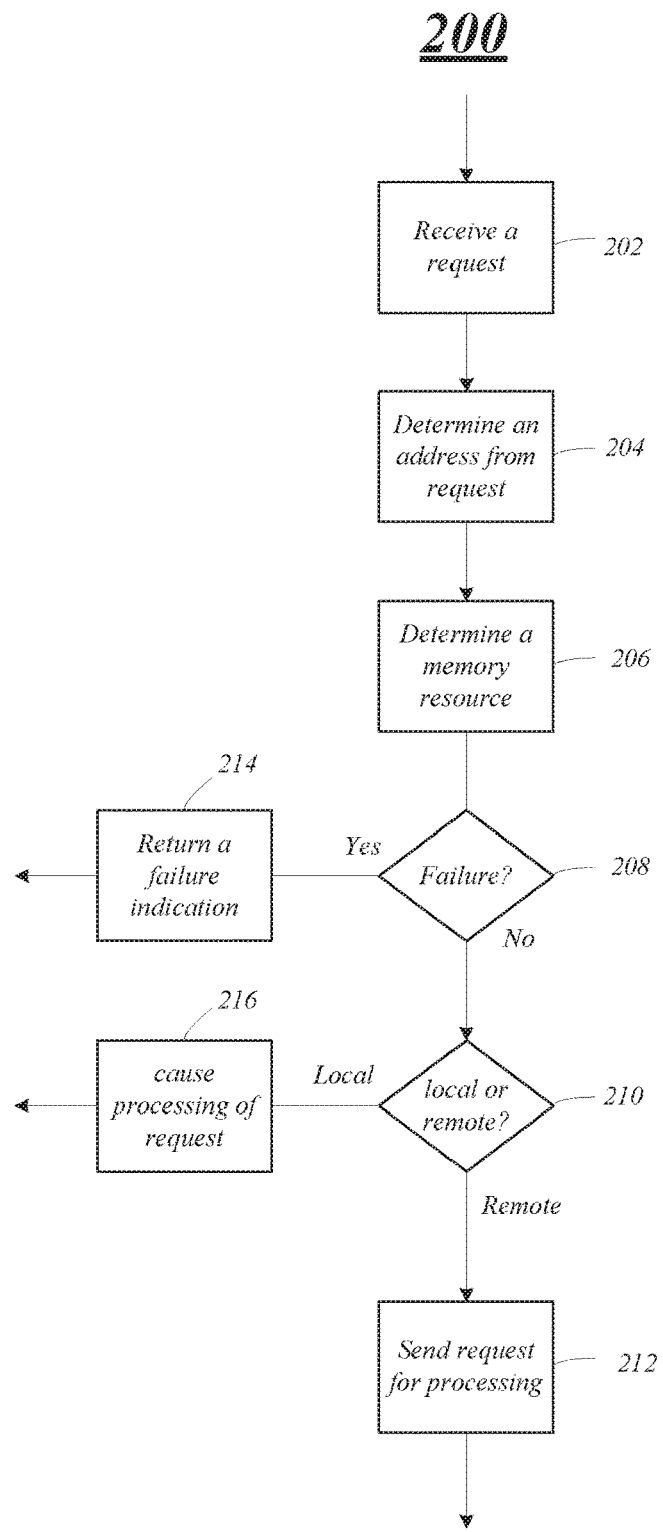
FIG. 2 illustrates an example of a first logic flow.

FIG. 2 illustrates an example of a logic flow 200 that may be representative of some or all of the operations executed by one or more embodiments described herein. For example, the logic flow 200 may illustrate operations performed by a memory resource 151, and in particular an interface 160, as described herein. However, embodiments are not limited in this manner. For example, a memory indirection operation, as discussed with respect to FIG. 2, may be performed by the requesting resource, such as a computing resource 101 and interface 120.

At block 202, the logic flow 200 includes receiving a request from a computing resource by an interface; the request may be a read request to read data from memory or write request to write data to memory. In one example, the request includes a load instruction to load data from memory to one or more registers of a CPU of the computing resource sending the request. The interface may receive the request and determine the request is an indirect instruction based on the instruction itself, e.g., the instruction may be a fabric load instruction or a load instruction includes an address and an offset. In another example, the interface may determine the request is an indirect instruction based on a bit within the request indicating the request is an indirect instruction.

At block 204, the logic flow 200 includes determining an address from the request, which includes an address and an offset, as previously discussed. The address identifies a location in memory having a payload. For example, if the request is an indirect instruction, the address points to a location in memory having another address. At block 206 the logic flow includes determining the address at the location in the memory based on the received address. For example, embodiments include reading the memory at the location to determine the address stored within. The address in the location may be combined with the offset to determine another address of another location, which may be the actual location for the request or may include another address having the requested data.

In embodiments, the logic flow 200 includes determining a memory resource associated with the address combined with the offset at block 206. More specifically, a system address decoder is used to determine a memory associated with the address. A memory resource may be determined based on the memory associated with the address. The memory can be in a local memory resource or a remote memory resource, as will be discussed in more detail. At block 208, the logic flow 200 includes determining whether a failure has occurred. A failure may occur when attempting to read the location of memory or while determining a memory associated with the address by the system address decoder, for example. If a failure occurs, the logic flow 200 includes sending a response to the requesting computing resource indicating the failure at block 214.

At block 210, the logic flow 200 includes determining whether the memory is within the local memory resource or remote memory resource coupled via an interconnect. If the memory resource is local, the logic flow 200 may include causing the processing of the request, e.g., causing performance of a read or write memory operation at block 216. For example, a LOAD instruction may be issued. If the memory resource is remote, the logic flow 200 includes sending the request to the memory resource via the interconnect. The remote memory resource may receive the request and process the request. For example, a FABRIC-LOAD-I instructions may be issued. In some instances, the memory of the local or the remote memory resource may include another address at the location pointed to by the request's address and the logic flow 200 may be repeated. In other words, multiple levels of indirection may occur before the request is processed by a memory resource and returned to the computing resource.

Figure 3:
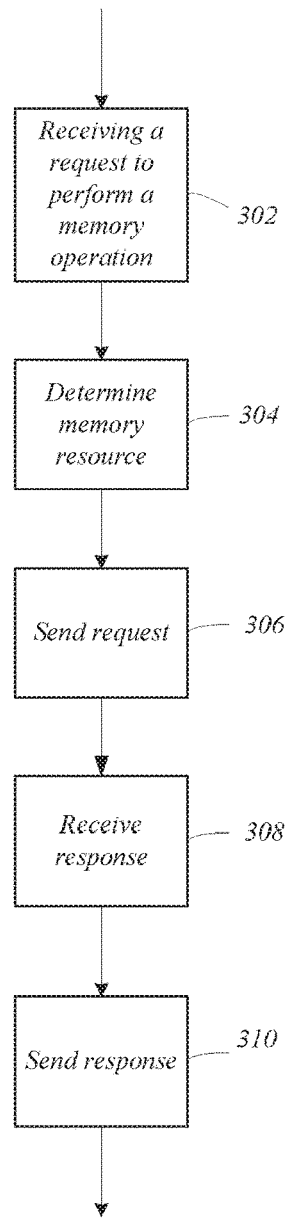
FIG. 3 illustrates an example of a second logic flow.

FIG. 3 illustrates an example of a logic flow 300 that may be representative of some or all of the operations executed by one or more embodiments described herein. For example, the logic flow 300 may illustrate operations performed by a computing resource 101, and in particular an interface 120, as described herein.

At block 302, the logic flow 300 includes receiving a request to perform a memory operation from a core. The request may be to perform the memory operation in disaggregated memory resources, e.g., a memory resource coupled via an interconnect (fabric or network) or a local memory resource, e.g., in the same resource as the core generating the request. The request includes an address and an offset to enable performance of a memory operation. The address and offset may be determined by a core by reading data in one or more data structures associated with memory allocation specifying locations for storage of data. In embodiments, the core may also indicate that the request is an instruction that is using indirection, e.g., an indirect instruction. For example, the request may include an indirect instruction, such as "FABRIC-LOAD-I <addr>, <offset>." In another example, the request includes a bit set indicating the request includes an indirect instruction. In some instances, multiple levels of indirection are used, and the fabric load or load instruction may include a number of iterations of indirections that are utilized.

At block 304, the logic flow 300 includes determining a memory resource to send the request. As previously mentioned, the memory resource may be coupled via an interconnect, such as a fabric or network interconnect, with the computing resource having the core generating the request. In one example, a system address decoder is used by the interface to determine the memory resource based on the address of the request associated with a memory located within a memory resource. In other instances, the memory resource may be local to the core generating the request. At block 306, the interface sends the request to the determined memory resource or processes the request locally. The interface may continue to communicate data and receive a response to the request.

At block 308, the interface may receive a response to the request. The response may include data requested in the request, an indication the memory operation completed successfully, and/or the memory operation failed. The interface may send the response to the requesting core at block 310. Embodiments are not limited to the operations indicating the logic flow 300 and one or more operations may occur before or after other operations.

Figure 4A:
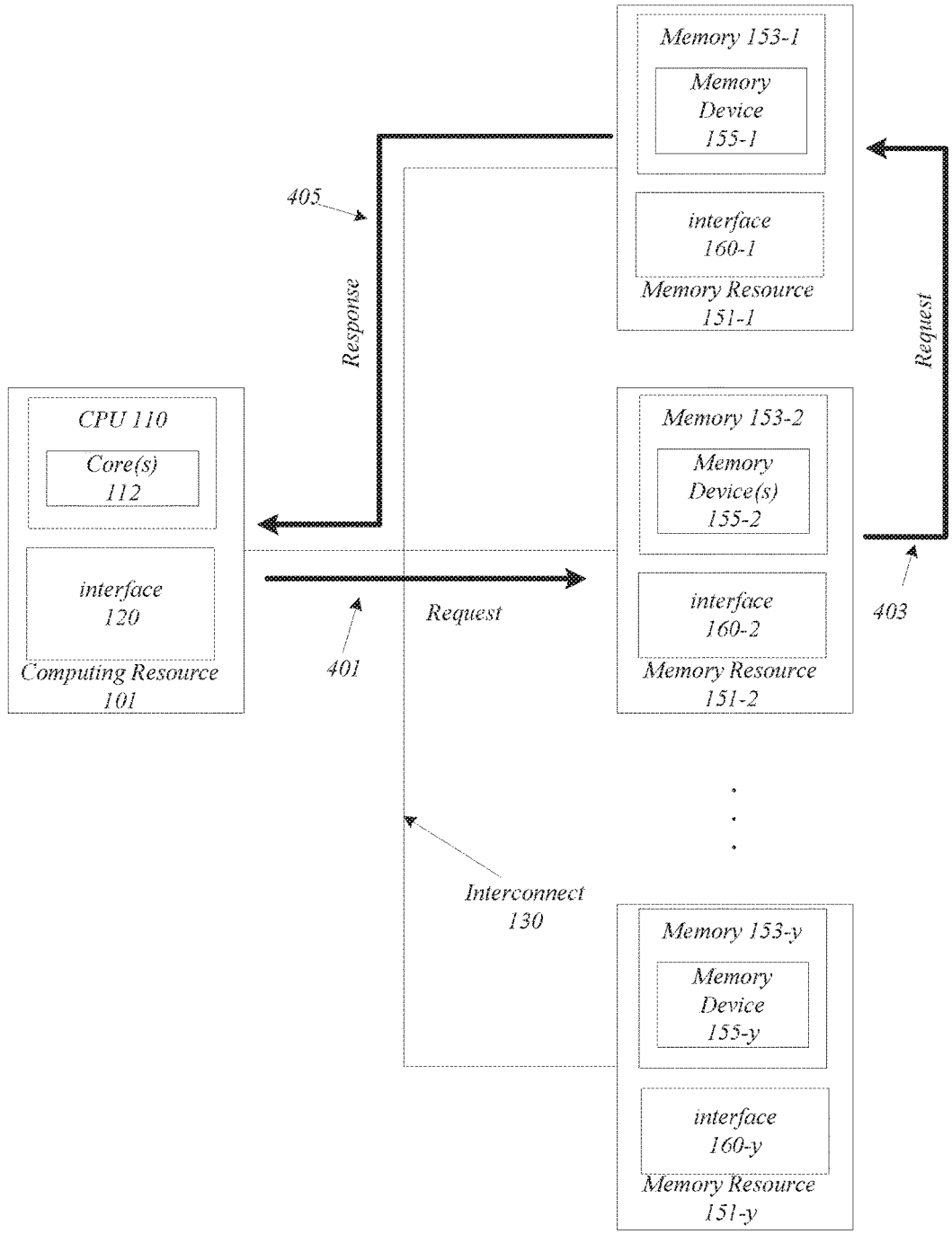
FIG. 4A illustrates an example of a first processing flow.

FIG. 4A illustrates an example of a first processing flow 400 to process a request by disaggregated memory resources. The illustrated example includes a computing resource 101 coupled to a plurality of memory resources 151-*y*, where y may be any positive integer, via one or more interconnects 130. The one or more interconnects 130 may be fabric interconnects, or network interconnects, as previously discussed. Moreover, FIG. 4A illustrates a system including on a single computing resource 101; however, embodiments are not limited in this manner. Embodiments may include more than one computing resources 101; each computing resource capable of communicating requests and receiving responses.

In the illustrated processing flow 400, the computing resource 101 including the interface 120 issues a request to perform a memory operation, such as a read or a write at line 401. The request includes an address pointing to a location in memory 153 and an offset. In this example, the request is sent to the memory resource 151-2 which is associated with the address in the request. Moreover, the interface 120 determines to send the request to the memory resource 151-2 based on an operation performed by a system address decoder identifying the memory resource 151-2 and memory 153-2.

The memory resource 151-2 including the interface 160-2 may receive the request and determine the request is an indirect instruction based on the request itself, e.g., the request includes an indirect instruction or based on a bit set in the request indicating the request includes an indirect instruction. The interface 160-2 and/or circuitry of the memory resource 151-2 may determine the contents of a location of memory 153-2 pointed to by the address in the request. If the request includes an indirection instruction, the location includes a second address that may be used to determine another address to send the request. More specifically, the offset in the request is applied to the address at a location to determine another address. The interface 160-2 utilizes the address to determine a memory resource to send the request. For example, the interface 160-2 may use a system address decoder to determine a memory resource associated with the address. In this example, the address is located in and associated with memory resource 151-1.

At line 403, the memory resource 151-2 including the interface 160-2 may send the request to the memory resource 151-1 associate the address based on the address located within memory 153-2 and the offset. The memory resource 151-1 may receive the request and processes the request. In the illustrated example, the memory resource 151-1 may perform the memory operation (read/write) associated with the request and return a response to the computing resource 101 at line 405. However, embodiments are not limited in this manner, and in some instances, the request communicated at 403 may include an indirect instruction to determine another memory resource to perform the memory request. As previously mentioned, multiple layers of indirection may be performed before the memory operation is performed and results are returned to the computing resource 101.

Figure 4B:
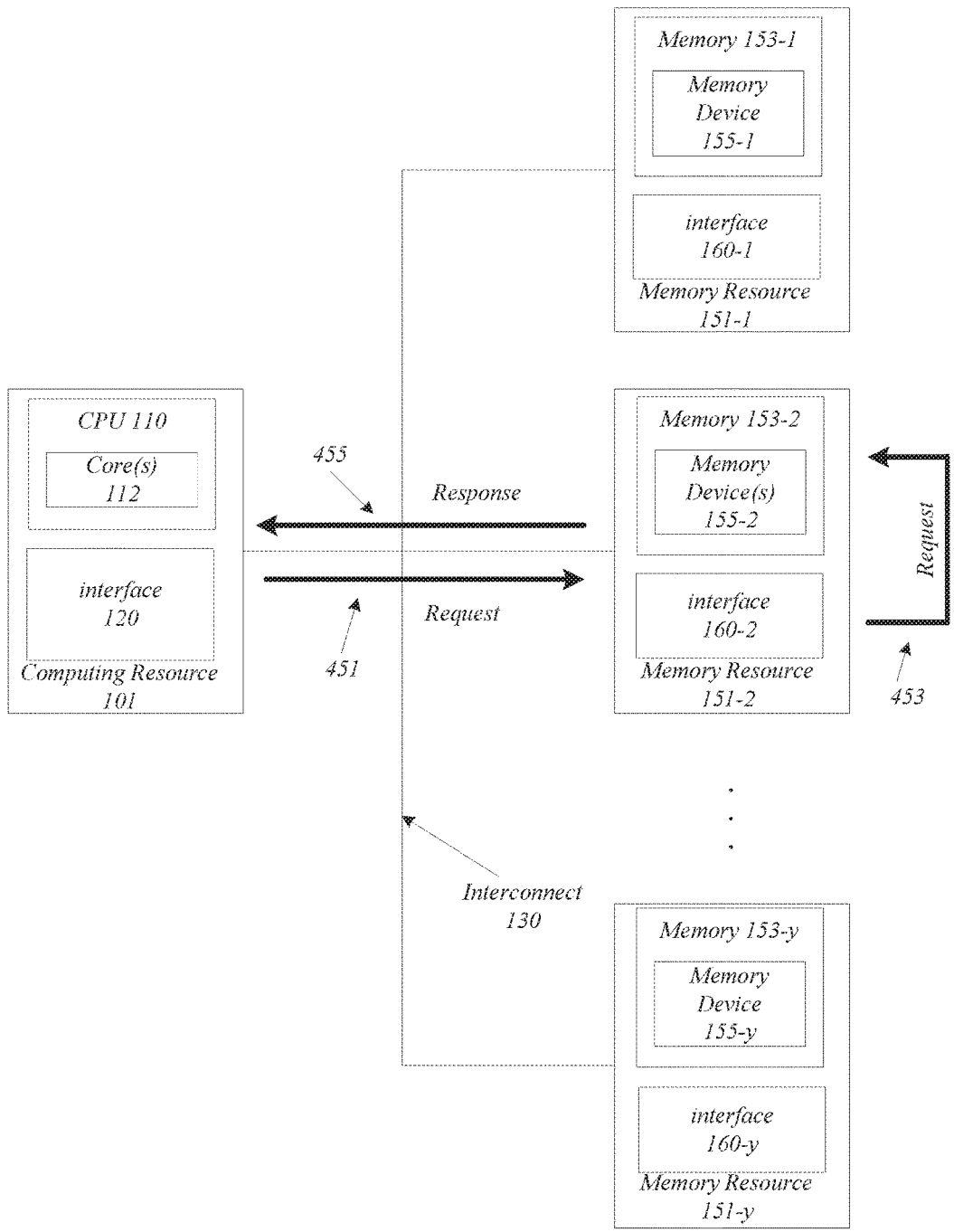
FIG. 4B illustrates an example of a second processing flow.

FIG. 4B illustrates an example of a second processing flow 450 to process a request by disaggregated memory resources. The illustrated example includes a computing resource 101 coupled to a plurality of memory resources 151-y, where y may be any positive integer, via one or more interconnects 130. The one or more interconnects 130 may be fabric interconnects, or network interconnects, as previously discussed. Moreover, FIG. 4B illustrates a system including on a single computing resource 101; however, embodiments are not limited in this manner. Embodiments may include more than one computing resources 101; each can communicate requests and receiving responses.

In the illustrated processing flow 450, the computing resource 101 including the interface 120 issues a request to perform a memory operation, such as a read or a write at line 451. The request includes an address pointing to a location in memory and an offset. In this example, the request is sent to the memory resource 151-2 which is associated with the address in the request. Moreover, the interface 120 determines to send the request to the memory resource 151-2 based on an operation performed by a system address decoder identifying the memory resource 151-2 and memory 153-2.

The memory resource 151-2 including the interface 160-2 may receive the request and determine the request is an indirect instruction based on the request itself, e.g., the request includes an indirect instruction or based on a bit set in the request indicating the request includes an indirect instruction. The interface 160-2 and/or circuitry of the memory resource 151-2 may determine the contents of a location of memory 153-2 pointed to by the address in the request. If the request includes an indirection instruction, the location includes an address that may be used with the offset to determine another address to send the request. More specifically, the offset in the request is applied to the address in the location of memory 153-2 to determine another address. The interface 160-2 utilizes the other address to determine a memory resource to send the request. For example, the interface 160-2 may use a system address decoder to determine a memory resource associated with the address. In this example, the address is located in and associated with memory resource 151-2, e.g., the local memory resource.

At line 453, the memory resource 151-2 may process the request. In the illustrated example, the memory resource 151-2 may perform the memory operation (read/write) associated with the request and return a response to the computing resource 101 at line 455. However, embodiments are not limited in this manner, and in some instances, the address may point to a location in memory 153-2 having another address that may be used to determine a memory resource to process the request or have another address. As previously mentioned, multiple layers of indirection may be performed before the memory operation is performed and a result is returned to the computing resource 101.

Figure 4C:
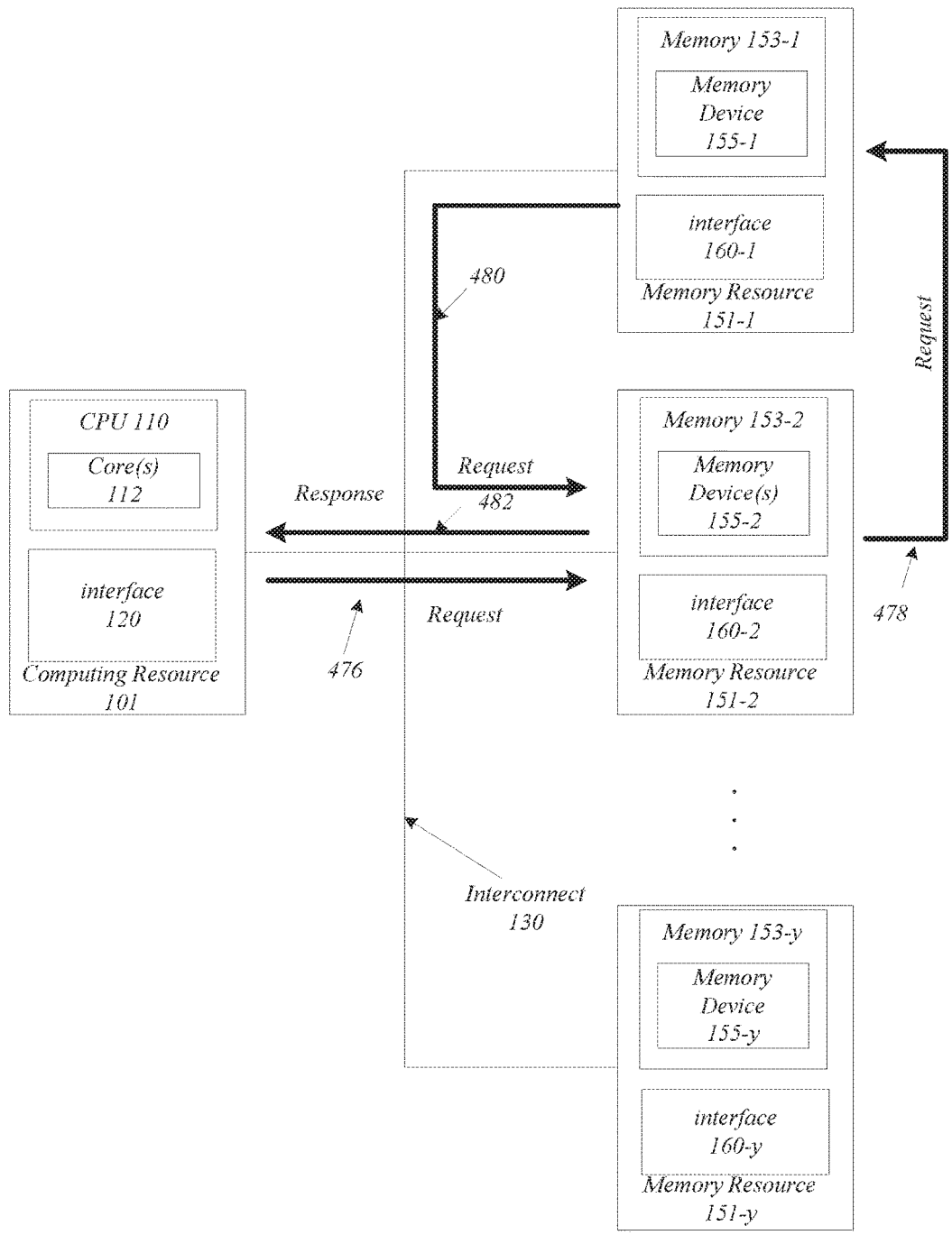
FIG. 4C illustrates an example of a third processing flow.

FIG. 4C illustrates an example of a third processing flow 475 to process a request by disaggregated memory resources with multiple levels of indirection. The illustrated example includes a computing resource 101 coupled to a plurality of memory resources 151-y, where y may be any positive integer, via one or more interconnects 130. The one or more interconnects 130 may be fabric interconnects, or network interconnects, as previously discussed. Moreover, FIG. 4C illustrates a system including on a single computing resource 101; however, embodiments are not limited in this manner. Embodiments may include more than one computing resources 101; each computing resource capable of communicating requests and receiving responses.

In the illustrated processing flow 475, the computing resource 101 including the interface 120 issues a request to perform a memory operation, such as a read or a write at line 476. The request includes an address pointing to a location in memory 153 and an offset and, in this example, may also include a number indicating a number of indirections that are to be performed to process the request. In this example, the request is sent to the memory resource 151-2 which is associated with the address in the request. The interface 120 determines to send the request to the memory resource 151-2 based on an operation performed by a system address decoder identifying the memory resource 151-2 and memory 153-2.

The memory resource 151-2 including the interface 160-2 may receive the request and determine the request is an indirect instruction based on the request itself, e.g., the request includes an indirect instruction or based on a bit set in the request indicating the request includes an indirect instruction. The interface 160-2 and/or circuitry of the memory resource 151-2 may determine the contents of a location of memory 153-2 pointed to by the address in the request. The request includes an indirection instruction and indication of a number of iterations of indirection. The memory location pointed to by the location in the request includes a second address that may be used to determine another address to send the request. More specifically, the offset in the request is applied to the address at a location to determine another address. The interface 160-2 utilizes the address to determine a memory resource to send the request. For example, the interface 160-2 may use a system address decoder to determine a memory resource associated with the address. In this example, the address is located in and associated with memory resource 151-1.

At line 478, the memory resource 151-2 including the interface 160-2 may send the request to the memory resource 151-1 associated with the address based on the address located within memory 153-2 and the offset. The memory resource 151-1 may receive the request and processes the request. In the illustrated example, the memory resource 151-1 may determine the request includes an indirect instruction. The interface 160-1 and/or circuitry of the memory resource 151-1 may determine the contents of a location of memory 153-1 pointed to by the address in the request. The memory location pointed to by the location in the request includes a second address that may be used to determine another address to send the request. More specifically, the offset in the request is applied to the address at a location to determine another address. The interface 160-1 utilizes the address to determine a memory resource to send the request. For example, the interface 160-1 may use a system address decoder to determine a memory resource associated with the address. In this example, the address is located in and associated with memory resource 151-2.

At line 480, the memory resource 151-1 including the interface 160-1 may send the request to the memory resource 151-2 associate the address based on the address located within memory 153-1 and the offset. The memory resource 151-2 may receive the request and processes the request. In the illustrated example, the memory resource 151-2 may perform the memory operation (read/write) associated with the request and return a response to the computing resource 101 at line 482. Embodiments are not limited in this manner discussed in this example. In this example, two levels of indirection were utilized and indicated in the request. However, embodiments may include any number of levels of indirection.

FIG. 5 illustrates an example of a first logic flow 500 that may be representative of some or all of the operations executed by one or more embodiments described herein. For example, the logic flow 500 may illustrate operations performed by a node, as described herein.

At block 505, the logic flow 500 may include receiving a request from a core, the request associated with a memory operation to read or write data, and the request comprising a first address and an offset, the first address to identify a memory location of a memory. In some instances, the request may also indicate a number of iterations of a memory indirection operation to be performed such that the read or write is processed. In embodiments, an interface of a memory resource may receive the request from the core. Alternatively, an interface local, e.g., in the same computing resource, to the core may receive and process the request.

At block 510, the logic flow 500 includes performing a first iteration of a memory indirection operation comprising reading the memory at the memory location to determine a second address based on the first address, and determining a memory resource based on the second address and the offset, the memory resource to perform the memory operation for the core or perform a second iteration of the memory indirection operation. In embodiments, the determined memory resource may include memory having memory devices and may be a remote memory resource, e.g., coupled via interconnects, or a local memory resource, e.g., the same memory resource. If the memory resource is a remote memory resource, an interface may communicate the request to the remote memory resource for further processing, such as determining the data to return to the core or performing another iteration of the memory indirection operation. Similarly, if the memory resource is a local memory resource, the local memory resource may determine the data for the core or perform another iteration of the memory indirection operation.

Figure 6:
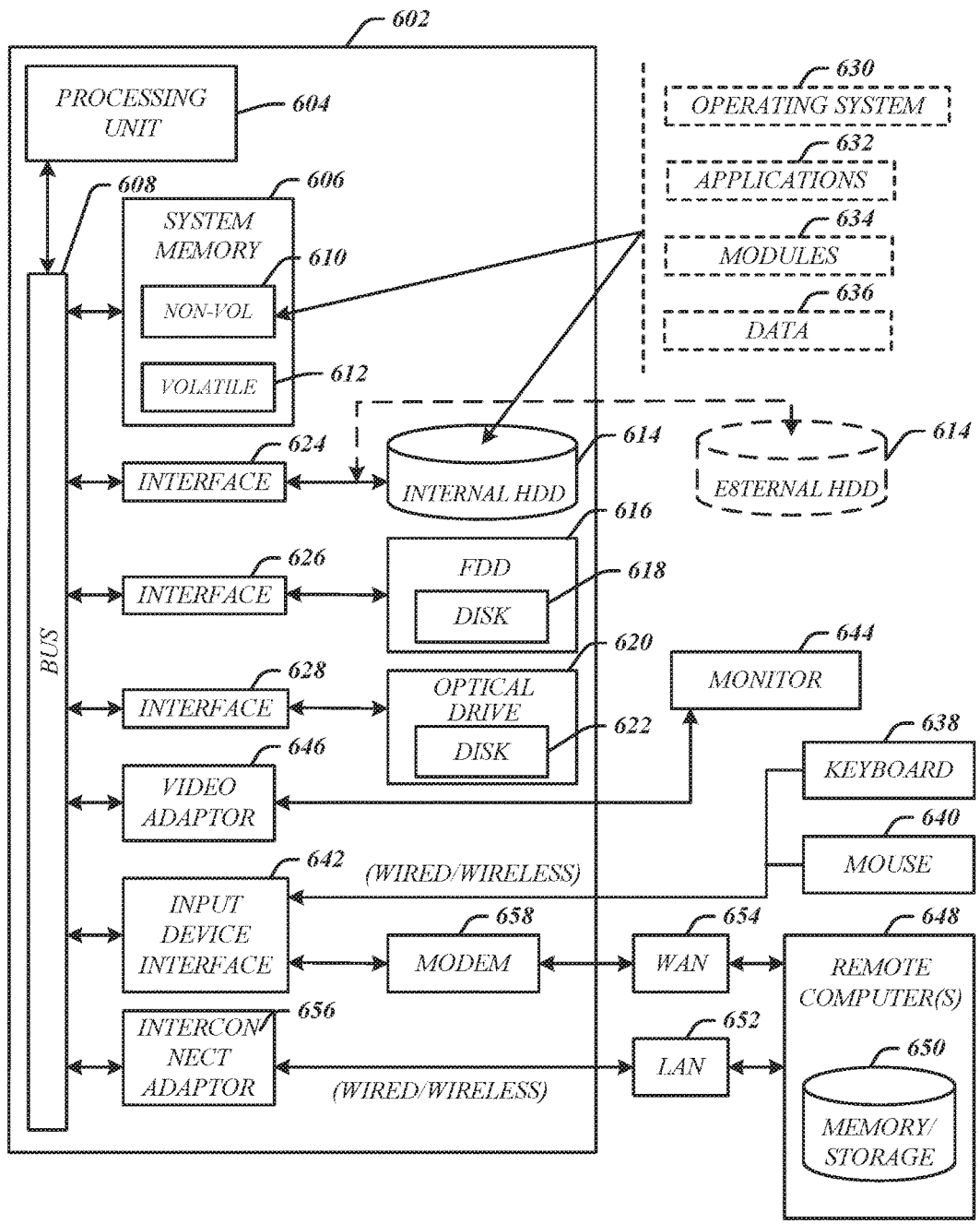
FIG. 6 illustrates an example embodiment of a computing architecture.

FIG. 6 illustrates an embodiment of an exemplary computing architecture 600 suitable for implementing various embodiments as previously described. In embodiments, the computing architecture 600 may include or be implemented as part of a node, for example.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and thread of execution, and a component can be localized on one computer and distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 616, and an optical disk drive 620 to read from or write to a removable optical disk 622 (e.g., a CD-ROM or DVD). The HDD 614, FDD 616 and optical disk drive 620 can be connected to the system bus 608 by an HDD interface 624, an FDD interface 626 and an optical drive interface 626, respectively. The HDD interface 624 for external drive implementations can include at least one or both of Universal Serial Bus (USB) and IEEE 1394 interface technologies.

The drives and associated computer-readable media provide volatile and nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and components of the system 100.

A user can enter commands and information into the computer 602 through one or more wire/wireless input devices, for example, a keyboard 636 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and wireless communications to one or more remote computers, such as a remote computer 646. The remote computer 646 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and larger networks, for example, a wide area network (WAN) 654. Such LAN and WAN networking environments are commonplace in offices and companies and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 656, or is connected to a communications server on the WAN 654, or has other means for establishing communications over the WAN 654, such as by way of the Internet. The modem 656, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.11x (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-6 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-nine provided below are intended to be exemplary and non-limiting.

In a first example, a system, a device, an apparatus, and so forth may include processing circuitry to receive a request from a core, the request associated with a memory operation to read or write data, and the request comprising a first address and an offset, the first address to identify a memory location of a memory, and perform a first iteration of a memory indirection operation comprising reading the memory at the memory location to determine a second address based on the first address, and determining a memory resource based on the second address and the offset, the memory resource to perform the memory operation for the core or perform a second iteration of the memory indirection operation.

In a second example and in furtherance of the first example, a system, a device, an apparatus, and so forth to include processing circuitry to determine a third address based on the second address and the offset, the third address associated with the memory resource.

In a third example and in furtherance of any previous example, a system, a device, an apparatus, and so forth to include processing circuitry to perform a lookup in a system address decoder using the third address to determine the memory resource from a plurality memory resources.

In a fourth example and in furtherance of any previous example, a system, a device, an apparatus, and so forth to include processing circuitry to return a response comprising a failure indication indicating performance of the lookup in the system address decoder failed, the failure indication to indicate at least one of a failed address and a failed iteration of memory indirection operation.

In a fifth example and in furtherance of any previous example, a system, a device, an apparatus, and so forth to include processing circuitry to determine the memory resource is a remote memory resource and send the request to remote memory resource via a fabric network or Ethernet network coupled via an interface, the remote memory resource to perform the memory operation to read or write data or to perform the second iteration of the memory indirection operation, or determine the memory resource is a local memory resource and process the memory operation to read or write data or perform the second iteration of the memory indirection operation. In a sixth example and in furtherance of any previous example, a system, a device, an apparatus, and so forth to include processing circuitry to perform the second iteration of the memory indirection operation comprising reading memory at a memory location to determine a fourth address based on a third address, and determining a memory resource based on the fourth address and an offset, the memory resource to perform the memory operation for the core.

In a seventh example and in furtherance of any previous example, a system, a device, an apparatus, and so forth to include processing circuitry to receive the request from the core via a fabric or network coupled with an interface.

In an eighth example and in furtherance of any previous example, a system, a device, an apparatus, and so forth to include the memory operation comprises a read to read data from memory or a write to write data to memory.

In a ninth example and in furtherance of any previous example, a system, a device, an apparatus, and so forth to include wherein the third address comprising the second address plus the offset.

In a tenth example and in furtherance of any previous example, a system, a device, an apparatus, and so forth to include an interface comprising the processing circuitry and the logic, the interface is one of a host fabric interface and a network interface.

In an eleventh example and in furtherance of any previous example, a non-transitory computer-readable storage medium, comprising a plurality of instructions, that when executed, enable processing circuitry to receive a request from a core, the request associated with a memory operation to read or write data, and the request comprising a first address and an offset, the first address to identify a memory location of a memory, and perform a first iteration of a memory indirection operation comprising reading the memory at the memory location to determine a second address based on the first address, and determining a memory resource based on the second address and the offset, the memory resource to perform the memory operation for the core or perform a second iteration of the memory indirection operation In a twelfth example and in furtherance of any previous example, a non-transitory computer-readable storage medium, comprising a plurality of instructions, that when executed, enable processing circuitry to determine a third address based on the second address and the offset, the third address associated with the memory resource, wherein the third address comprising the second address plus the offset.

In a thirteenth example and in furtherance of any previous example, a non-transitory computer-readable storage medium, comprising a plurality of instructions, that when executed, enable processing circuitry to perform a lookup in a system address decoder using the third address to determine the memory resource from a plurality memory resources.

In a fourteenth example and in furtherance of any previous example, a non-transitory computer-readable storage medium, comprising a plurality of instructions, that when executed, enable processing circuitry to return a response comprising a failure indication indicating performance of the lookup in the system address decoder failed, the failure indication to indicate at least one of a failed address and a failed iteration of memory indirection operation.

In a fifteenth example and in furtherance of any previous example, a non-transitory computer-readable storage medium, comprising a plurality of instructions, that when executed, enable processing circuitry to determine the memory resource is a remote memory resource and send the request to remote memory resource via a fabric network or Ethernet network coupled via an interface, the remote memory resource to perform the memory operation to read or write data or to perform the second iteration of the memory indirection operation, or determine the memory resource is a local memory resource and process the memory operation to read or write data or perform the second iteration of the memory indirection operation In a sixteenth example and in furtherance of any previous example, a non-transitory computer-readable storage medium, comprising a plurality of instructions, that when executed, enable processing circuitry to determine a fourth address based on a third address, and determining a memory resource based on the fourth address and an offset, the memory resource to perform the memory operation for the core.

In a seventeenth example and in furtherance of any previous example, a non-transitory computer-readable storage medium, comprising a plurality of instructions, that when executed, enable processing circuitry to perform the memory operation comprises a read to read data from memory or a write to write data to memory.

In an eighteenth example and in furtherance of any previous example, a computer-implemented method may include receiving a request from a core, the request associated with a memory operation to read or write data, and the request comprising a first address and an offset, the first address to identify a memory location of a memory, and performing a first iteration of a memory indirection operation comprising reading the memory at the memory location to determine a second address based on the first address, and determining a memory resource based on the second address and the offset, the memory resource to perform the memory operation for the core or perform a second iteration of the memory indirection operation.

In a nineteenth example and in furtherance of any previous example, a computer-implemented method may include determining a third address based on the second address and the offset, the third address associated with the memory resource, wherein the third address comprising the second address plus the offset.

In a twentieth example and in furtherance of any previous example, a computer-implemented method may include performing a lookup in a system address decoder using the third address to determine the memory resource from a plurality memory resources.

In a twenty-first example and in furtherance of any previous example, a computer-implemented method may include returning a response comprising a failure indication indicating performance of the lookup in the system address decoder failed, the failure indication to indicate at least one of a failed address and a failed iteration of memory indirection operation.

In a twenty-second example and in furtherance of any previous example, a computer-implemented method may include determine the memory resource is a remote memory resource and send the request to remote memory resource via a fabric network or Ethernet network coupled via an interface, the remote memory resource to perform the memory operation to read or write data or to perform the second iteration of the memory indirection operation, or determine the memory resource is a local memory resource and process the memory operation to read or write data or perform the second iteration of the memory indirection operation In a twenty-third example and in furtherance of any previous example, a computer-implemented method may include performing the second iteration of the memory indirection operation comprising reading memory at a memory location to determine a fourth address based on a third address, and determining a memory resource based on the fourth address and an offset, the memory resource to perform the memory operation for the core.

In a twenty-fourth example and in furtherance of any previous example, a computer-implemented method may include performing the memory operation comprises a read to read data from memory or a write to write data to memory.

In a twenty-fifth example and in furtherance of any previous example, a system, a device, an apparatus, and so forth to include means for receiving a request from a core, the request associated with a memory operation to read or write data, and the request comprising a first address and an offset, the first address to identify a memory location of a memory, and means for performing a first iteration of a memory indirection operation comprising reading the memory at the memory location to determine a second address based on the first address, and determining a memory resource based on the second address and the offset, the memory resource to perform the memory operation for the core or perform a second iteration of the memory indirection operation.

In a twenty-sixth example and in furtherance of any previous example, a system, a device, an apparatus, and so forth to include means for determining a third address based on the second address and the offset, the third address associated with the memory resource, wherein the third address comprising the second address plus the offset.

In a twenty-seventh example and in furtherance of any previous example, a system, a device, an apparatus, and so forth to include means for performing a lookup in a system address decoder using the third address to determine the memory resource from a plurality memory resources.

In a twenty-eighth example and in furtherance of any previous example, a system, a device, an apparatus, and so forth to include means for returning a response comprising a failure indication indicating performance of the lookup in the system address decoder failed, the failure indication to indicate at least one of a failed address and a failed iteration of memory indirection operation.

In a twenty-ninth example and in furtherance of any previous example, a system, a device, an apparatus, and so forth to include means for determining the memory resource is a remote memory resource and send the request to remote memory resource via a fabric network or Ethernet network coupled via an interface, the remote memory resource to perform the memory operation to read or write data or to perform the second iteration of the memory indirection operation, or means for determining the memory resource is a local memory resource and process the memory operation to read or write data or perform the second iteration of the memory indirection operation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "including" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   memory at a first one of a plurality of disaggregate memory resources;
   an interface at the first one of the plurality of disaggregate memory resources, the interface comprising:
   processing circuitry; and
   logic comprising one or more instructions, that when executed by the processing circuitry, cause the processing circuitry to:
   receive, at the first one of the plurality of disaggregate memory resources, a request from a core of a computing resource, the request associated with a memory operation to read or write data, and the request comprising a first address and an offset, the first address to identify a memory location of the memory;
   perform a first iteration of a memory indirection operation comprising reading the memory at the memory location to determine a second address based on the first address, and determining a second memory location of memory of one of the plurality of disaggregate memory resources based on the second address and the offset;
   perform a second iteration of the memory indirection operation to include reading the memory at the second memory location; and
   return a response to the core of the computing resource based on the second iteration of the memory indirection operation.

2. The apparatus of claim 1, the processing circuitry to determine a third address based on the second address and the offset, the third address associated with the memory resource.

3. The apparatus of claim 2, the processing circuitry to perform a lookup in a system address decoder using the third address to determine the memory resource from a plurality memory resources.

4. The apparatus of claim 3, the processing circuitry to return a response comprising a failure indication indicating performance of the lookup in the system address decoder failed, the failure indication to indicate at least one of a failed address and a failed iteration of memory indirection operation.

5. The apparatus of claim 1, the processing circuitry to:
   determine the memory resource is a remote memory resource and send the request to remote memory resource via a fabric network or Ethernet network coupled via an interface, the remote memory resource to perform the memory operation to read or write data or to perform the second iteration of the memory indirection operation; or
   determine the memory resource is a local memory resource and process the memory operation to read or write data or perform the second iteration of the memory indirection operation.

6. The apparatus of claim 1, the second iteration of the memory indirection operation comprising reading memory at a memory location to determine a fourth address based on a third address, and determining a memory resource based on the fourth address and an offset, the memory resource to perform the memory operation for the core.

7. The apparatus of claim 1, the processing circuitry to receive the request from the core via a fabric or network coupled with an interface.

8. The apparatus of claim 1, wherein the memory operation comprises a read to read data from memory or a write to write data to memory.

9. The apparatus of claim 2, wherein the third address comprising the second address plus the offset.

10. The apparatus of claim 1, comprising an interface comprising the processing circuitry and the logic, the interface is one of a host fabric interface and a network interface.

11. A non-transitory computer-readable storage medium, comprising a plurality of instructions, that when executed, enable processing circuitry at an interface of a first one of a plurality of disaggregate memory resources to:
    receive a request from a core of a computing resource, the request associated with a memory operation to read or write data, and the request comprising a first address and an offset, the first address to identify a memory location of a memory of the first one of the plurality of disaggregate memory resources;
    perform a first iteration of a memory indirection operation comprising reading the memory at the memory location to determine a second address based on the first address, and determining a second memory location of memory of one of the plurality of disaggregate memory resources based on the second address and the offset;
    perform a second iteration of the memory indirection operation to include reading the memory at the second memory location; and
    return a response to the core of the computing resource based on the second iteration of the memory indirection operation.

12. The computer-readable storage medium of claim 11, comprising a plurality of instructions, that when executed, enable processing circuitry to determine a third address based on the second address and the offset, the third address associated with the memory resource, wherein the third address comprising the second address plus the offset.

13. The computer-readable storage medium of claim 12, comprising a plurality of instructions, that when executed, enable processing circuitry to perform a lookup in a system address decoder using the third address to determine the memory resource from a plurality memory resources.

14. The computer-readable storage medium of claim 13, comprising a plurality of instructions, that when executed, enable processing circuitry to return a response comprising a failure indication indicating performance of the lookup in the system address decoder failed, the failure indication to indicate at least one of a failed address and a failed iteration of memory indirection operation.

15. The computer-readable storage medium of claim 11, comprising a plurality of instructions, that when executed, enable processing circuitry to:
    determine the memory resource is a remote memory resource and send the request to remote memory resource via a fabric network or Ethernet network coupled via an interface, the remote memory resource to perform the memory operation to read or write data or to perform the second iteration of the memory indirection operation; or determine the memory resource is a local memory resource and process the memory operation to read or write data or perform the second iteration of the memory indirection operation.

16. The computer-readable storage medium of claim 11, the second iteration of the memory indirection operation comprising reading memory at a memory location to determine a fourth address based on a third address, and determining a memory resource based on the fourth address and an offset, the memory resource to perform the memory operation for the core.

17. The computer-readable storage medium of claim 12, wherein the memory operation comprises a read to read data from memory or a write to write data to memory.

18. A computer-implemented method, comprising:
receiving, at an interface of a first one of a plurality of disaggregate memory resources, a request from a core of a computing resource, the request associated with a memory operation to read or write data, and the request comprising a first address and an offset, the first address to identify a memory location of a memory of the first one of the plurality of disaggregate memory resources;
performing a first iteration of a memory indirection operation comprising reading the memory at the memory location to determine a second address based on the first address, and determining a second memory location of memory of one of the plurality of disaggregate memory resources based on the second address and the offset;
performing a second iteration of the memory indirection operation to include reading the memory at the second memory location; and
returning a response to the core of the computing resource based on the second iteration of the memory indirection operation.

19. The computer-implemented method of claim 18, comprising determining a third address based on the second address and the offset, the third address associated with the memory resource, wherein the third address comprising the second address plus the offset.

20. The computer-implemented method of claim 19, comprising performing a lookup in a system address decoder using the third address to determine the memory resource from a plurality memory resources.

21. The computer-implemented method of claim 20, comprising returning a response comprising a failure indication indicating performance of the lookup in the system address decoder failed, the failure indication to indicate at least one of a failed address and a failed iteration of memory indirection operation.

22. The computer-implemented method of claim 18, comprising:
determine the memory resource is a remote memory resource and send the request to remote memory resource via a fabric network or Ethernet network coupled via an interface, the remote memory resource to perform the memory operation to read or write data or to perform the second iteration of the memory indirection operation; or
determine the memory resource is a local memory resource and process the memory operation to read or write data or perform the second iteration of the memory indirection operation.

23. The computer-implemented method of claim 18, the second iteration of the memory indirection operation comprising reading memory at a memory location to determine a fourth address based on a third address, and determining a memory resource based on the fourth address and an offset, the memory resource to perform the memory operation for the core.

24. The computer-implemented method of claim 19, wherein the memory operation comprises a read to read data from memory or a write to write data to memory.

* * * * *